March 19, 1929.  W. E. DILLARD  1,706,108
OIL GAUGE
Filed May 4, 1925
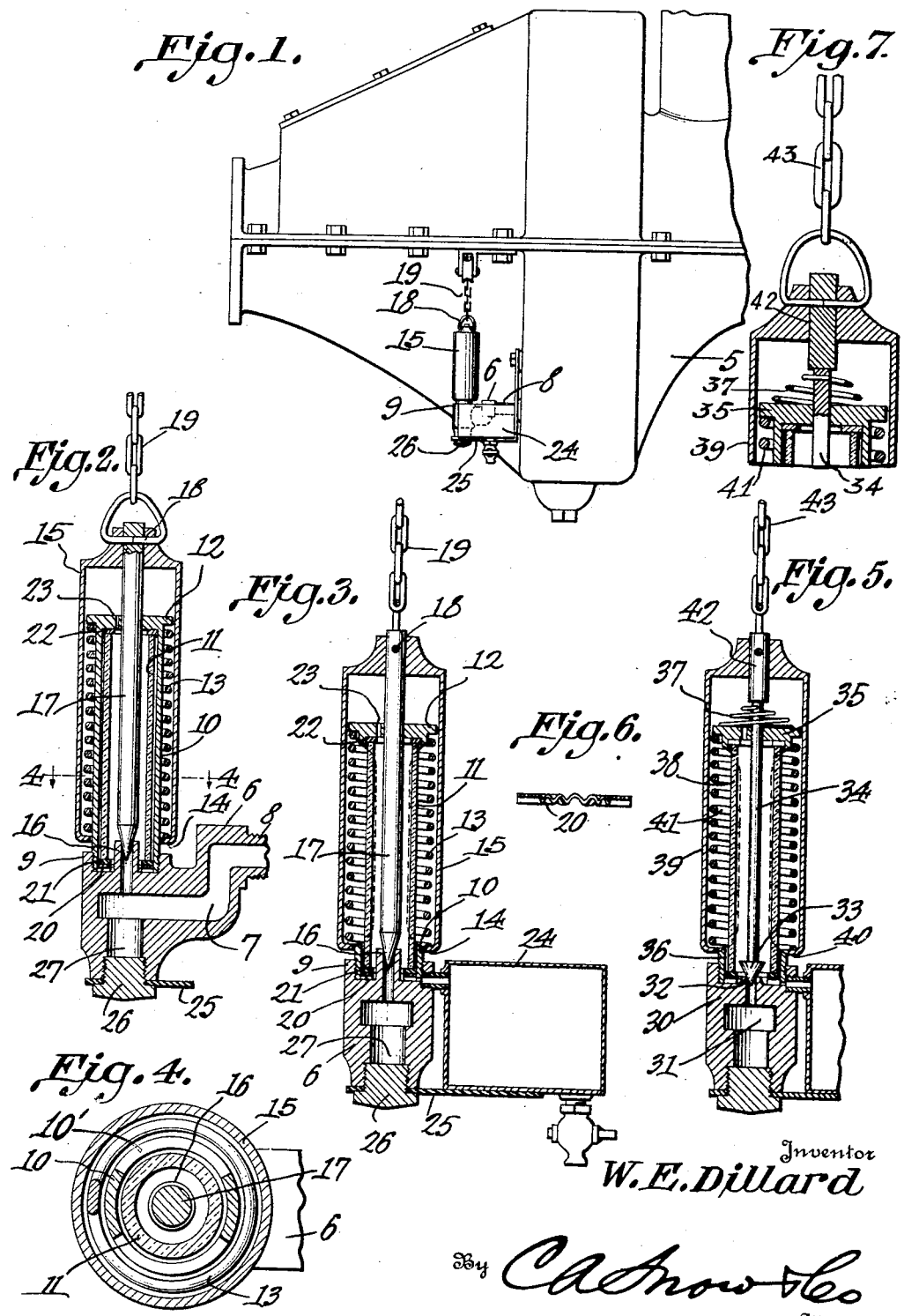
Inventor
W. E. Dillard
By C. A. Snow & Co
Attorney Patented Mar. 19, 1929.

1,706,108

UNITED STATES PATENT OFFICE.

WALTER E. DILLARD, OF LANESVILLE, VIRGINIA.

OIL GAUGE.

Application filed May 4, 1925. Serial No. 27,822.

This invention relates to oil gauges and more particularly to oil gauges especially designed for use in connection with crank casings of motor vehicles.

The primary object of the invention is to provide an oil gauge in communication with the crank casing, novel means being provided to admit oil to the oil gauge at the will of the operator, the oil seeking its level in the gauge, and passing from the gauge when the oil controlling means has moved to its normal position.

A further object of the invention is to provide a receptacle at the base of the gauge to receive the oil after it has passed into the oil gauge and accomplished its purpose.

A still further object is to provide means to insure a clean gauge tube at all times, to the end that the oil level in the gauge tube will be visible when the guard has been moved to expose the gauge tube.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view illustrating the portion of a crank case supplied with an oil gauge constructed in accordance with the invention.

Figure 2 is a longitudinal sectional view through the preferred form of oil gauge forming the essence of the invention.

Figure 3 is a longitudinal sectional view taken at right angles to Figure 2.

Figure 4 is a sectional view taken on line 4—4 of Figure 2.

Figure 5 is a longitudinal sectional view through a modified form of the invention.

Figure 6 is a transverse sectional view through the corrugated washer forming a part of the invention.

Figure 7 is a fragmental enlarged sectional view taken through the upper portion of the device as shown by Figure 5.

Referring to the drawing in detail, the reference character 5 indicates the crank case of a motor vehicle which is ordinarily supplied with pet cocks to indicate the oil level in the crank casing, but which in the present showing have been removed and replaced by an oil gauge constructed in accordance with the invention.

The gauge includes a base 6 which is formed with a bore 7 and provided with a threaded portion 8 to permit the device to be positioned in the usual pet cock opening of the crank casing. A flange indicated at 9 is formed on the upper surface of the base 6, which flange is formed with internal threads to accommodate the tube cage 10 which is also formed with a threaded extremity and provided with suitable cut out portions 10′ to permit the gauge tube 11 to be viewed therethrough.

At the upper end of the cage 10 is a flange 12 that provides a seat for the upper end of the coiled spring 13, which coiled spring has its lower end bearing against the inwardly extended annular flange 14 formed at the lower end of the guarding sleeve 15. Extending upwardly from the base and arranged centrally thereof is a tubular member 16 formed with inclined surfaces providing a valve seat for the valve member 17 which extends upwardly through the gauge tube and through the upper end of the tube cage, where it has connection with the sleeve 15 by means of the link 18 which provides means for connecting the operating chain 19 to the valve and sleeve 15.

At the base of the tube 11 is a corrugated washer 20 on which is positioned the washer 21 against which the tube 11 bears to provide a fluid-tight connection between the tube and base to prevent liquid from passing upwardly between the tube 11 and cage 10. The corrugations of washer 20 radiate from the center of the washer and extend to the outer edge of the washer, defining spaces or passageways to allow liquid to drain from the tube 11.

At the upper end of the tube 11 is a washer 22 which provides a fluid-tight connection at this end of the tube. In order that air which is displaced by the incoming oil, may pass from the tube 11, an opening 23 is provided in the upper end of the cage 10.

Communicating with the base of the gauge tube 11 through the spaces afforded by the corrugated washer 20, is a receptacle 24 which rests on the plate 25 secured to the base 6, by means of the plug 26 which passes through an opening in the plate 25 and into a threaded bore 27 formed in the base and communicating with the bore 7. It will thus be seen that the plug 26 may be removed and the contents of the gauge drained, should it be desired to clean the interior of the gauge.

In the form of the invention as illustrated by Figure 5, the base of the gauge is indicated at 30 and is provided with a bore 31 communicating with the interior of the crank casing by a suitable extension not shown and forming a part of the base. The base 30 is formed with a valve seat 32 to be engaged by the valve member 33 carried at the lower end of the valve stem 34, which passes upwardly through the end wall 35 of the valve cage 36, where the valve stem has connection with the coiled spring 37 that rests on the end wall 35 of the cage.

Operating over the cage and gauge tube 38 is a guarding sleeve 39 which has an inwardly extended flange 40 formed integral therewith which flange engages the lower end of the coiled spring 41 that has its upper end bearing against the end wall 35 of the cage to the end that as the sleeve 39 is moved upwardly, the tension of the coiled spring 37 will be sufficient to move the valve member 33 from its seat, to allow oil to enter the oil gauge 38.

Extending into the upper end of the sleeve 39 is a pin 42 that engages the upper end of the valve stem 34 to cause the valve 33 carried at the lower end thereof to seat when the sleeve 39 is returned to its normal position by the coiled spring 41.

The operating chain in this form of the invention is indicated at 43 and is adapted to extend to a position to be conveniently operated at a point adjacent to the running board, eliminating the necessity of a person getting under the car to make a test of the quantity of oil contained in the crank case supplied with the gauge.

In the use of the device should it be desired to determine the oil level in the crank case supplied with a gauge constructed in accordance with the invention, it is only necessary to pull the operating chain of the gauge, to the end that the guarding sleeve will move vertically exposing the gauge tube, and at the same time moving the valve member from its seat, allowing oil to enter the gauge tube where it may be viewed by the person operating the sleeve.

After the test has been made, the coiled spring that engages the sleeve, returns the sleeve to its initial position and at the same time causes the valve to seat and cut off the passage of oil from the crank casing to the gauge tube.

It will be obvious that the oil contained in the gauge tube will now pass downwardly and into the container 24 communicating therewith, through the spaces provided by the corrugated washer.

I claim:—

An oil gauge for determining the oil level in crank casings, including a hollow base secured to a crank casing, said base having a passageway adapted to communicate with the interior of said casing so as to admit oil from said casing to the interior of said base, a transparent gauge tube supported by and in communication with the interior of the base by means of a vertical bore, said bore being provided with a valve seat, a corrugated member on the base on which the tube rests, a vertically movable sleeve enclosing and guarding the gauge tube, a valve carried by the sleeve cooperating with the valve seat and adapted to operate upon the vertical displacement of said sleeve to admit liquid to the gauge tube, a receptacle for receiving liquid from the gauge tube, and said corrugated member defining a passageway through which oil passes into the receptacle.

In testimony that I claim the foregoing as my own, I have hereto affixed my signature.

WALTER E. DILLARD.